United States Patent [19]

Heling

[11] 4,456,450
[45] Jun. 26, 1984

[54] MANUAL EXTRUDER FOR SHAPING PASTA OR SIMILAR PRODUCTS

[75] Inventor: Paul Heling, Solingen, Fed. Rep. of Germany

[73] Assignee: Gerdes GmbH & Co., Schwelm, Fed. Rep. of Germany

[21] Appl. No.: 486,921

[22] Filed: Apr. 20, 1983

[30] Foreign Application Priority Data

Apr. 24, 1982 [DE] Fed. Rep. of Germany ....... 3215362

[51] Int. Cl.³ .......................... B29F 3/01; A21C 3/04; A21C 11/18
[52] U.S. Cl. ................................ 425/376 R; 222/391; 401/66; 604/209
[58] Field of Search .................. 401/336, 65, 66, 176, 401/179; 222/391; 604/208, 210, 224; 425/376 R

[56] References Cited

U.S. PATENT DOCUMENTS

| 514,508 | 2/1894 | Shabley | 222/391 |
|---------|--------|---------|---------|
| 634,786 | 10/1899 | Willower | 425/376 R |
| 972,793 | 10/1910 | Allred | 425/376 R |
| 1,508,341 | 9/1924 | Lathan | 222/391 |
| 2,670,881 | 3/1954 | Sjöblom | 222/391 |
| 2,768,768 | 10/1956 | Cornell et al. | 222/391 |

FOREIGN PATENT DOCUMENTS 958011 7/1949 Fed. Rep. of Germany.
1140525 12/1962 Fed. Rep. of Germany.
2704432 8/1978 Fed. Rep. of Germany.

*Primary Examiner*—Willard E. Hoag
*Attorney, Agent, or Firm*—Karl F. Ross; Herbert Dubno

[57] ABSTRACT

A manually operable extrusion press, especially one for producing pasta from a mass of dough, comprises a cylinder with a piston whose piston rod is embraced by flexible prongs of an operating lever that are pivoted to the top of the cylinder opposite a bottom nozzle provided with one or more shaping apertures. The sides of the piston rod facing the prongs have serrations coacting with driving pawls disposed on the inner prong surfaces which are outwardly yieldable during an upswing and engage the serrations on a downswing of the lever, the serrations being also engageable by retaining pawls on the cylinder serving as backstops. A 90° rotation of the piston rod about its axis confronts both pairs of pawls with flat rod surfaces to enable free upward or downward motion of the piston. The entire assembly preferably consists of plastic material such as glass-fiber-reinforced polyamide.

20 Claims, 7 Drawing Figures

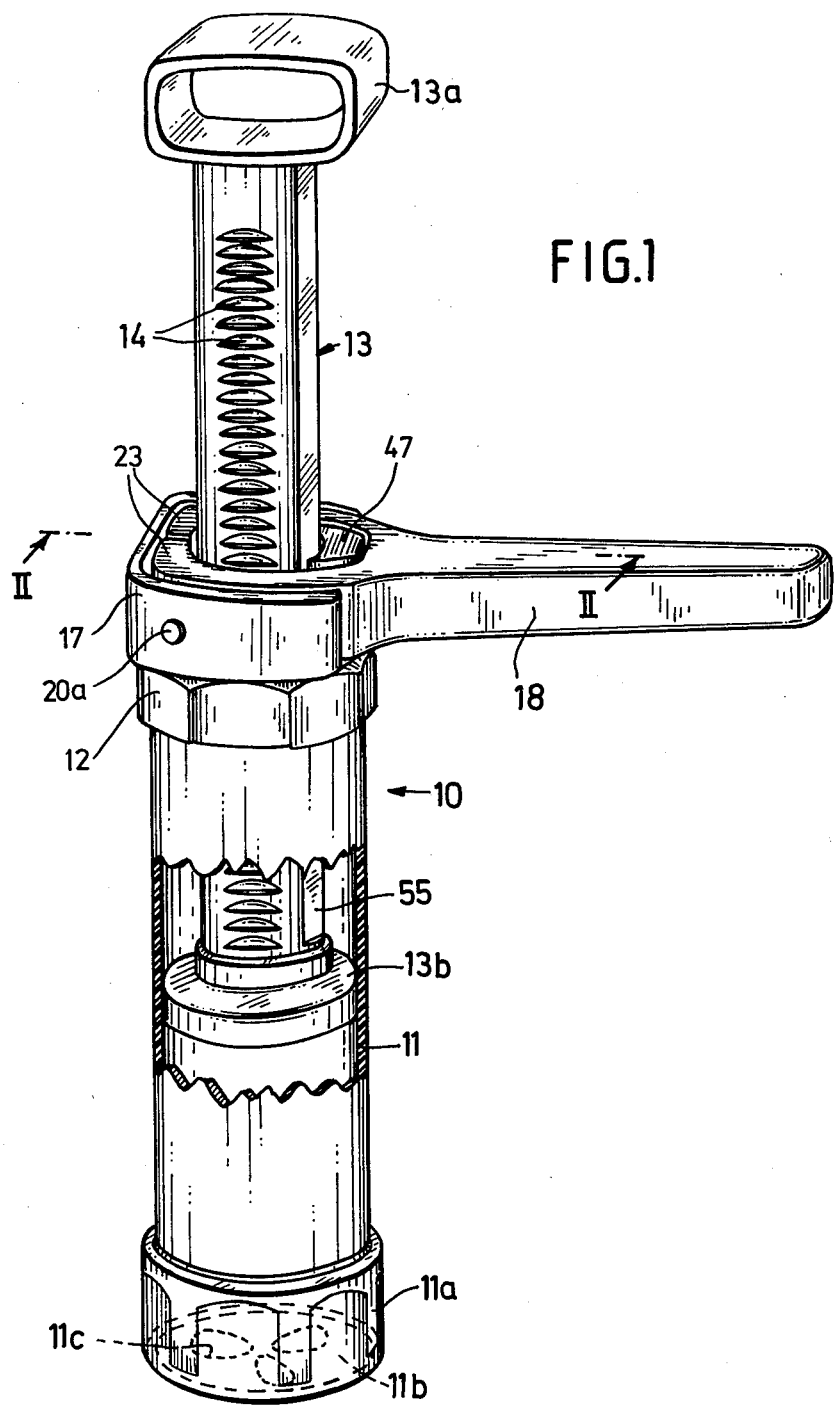

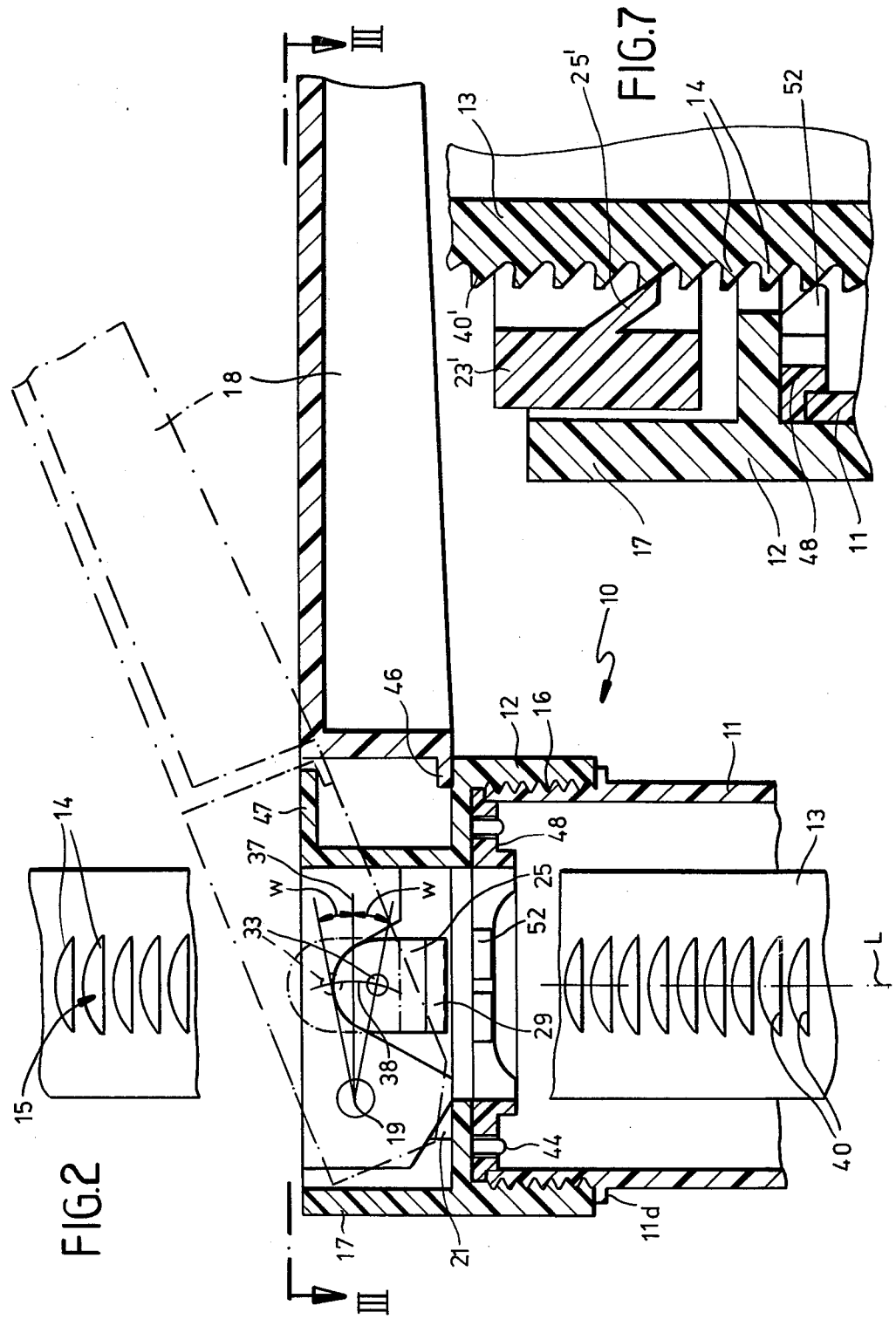

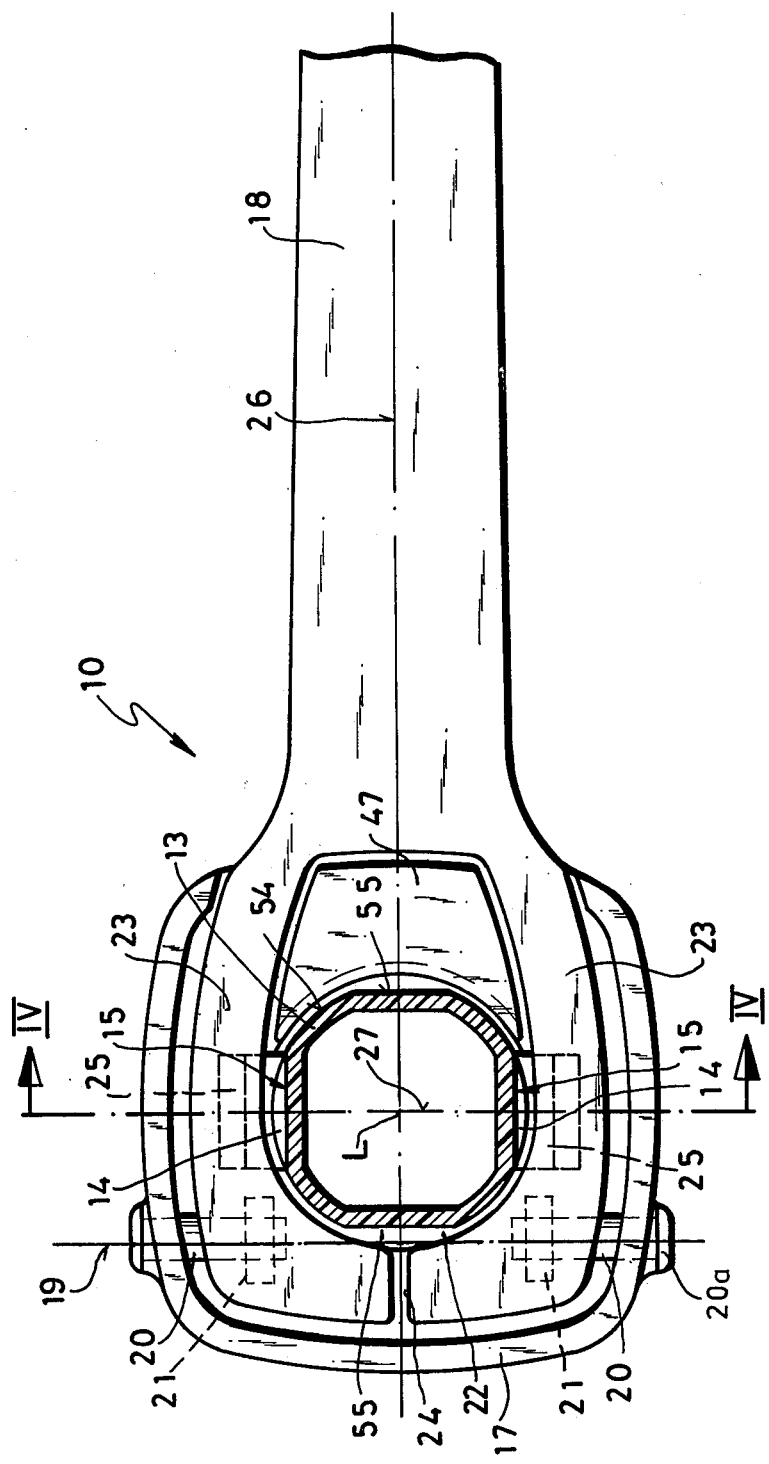

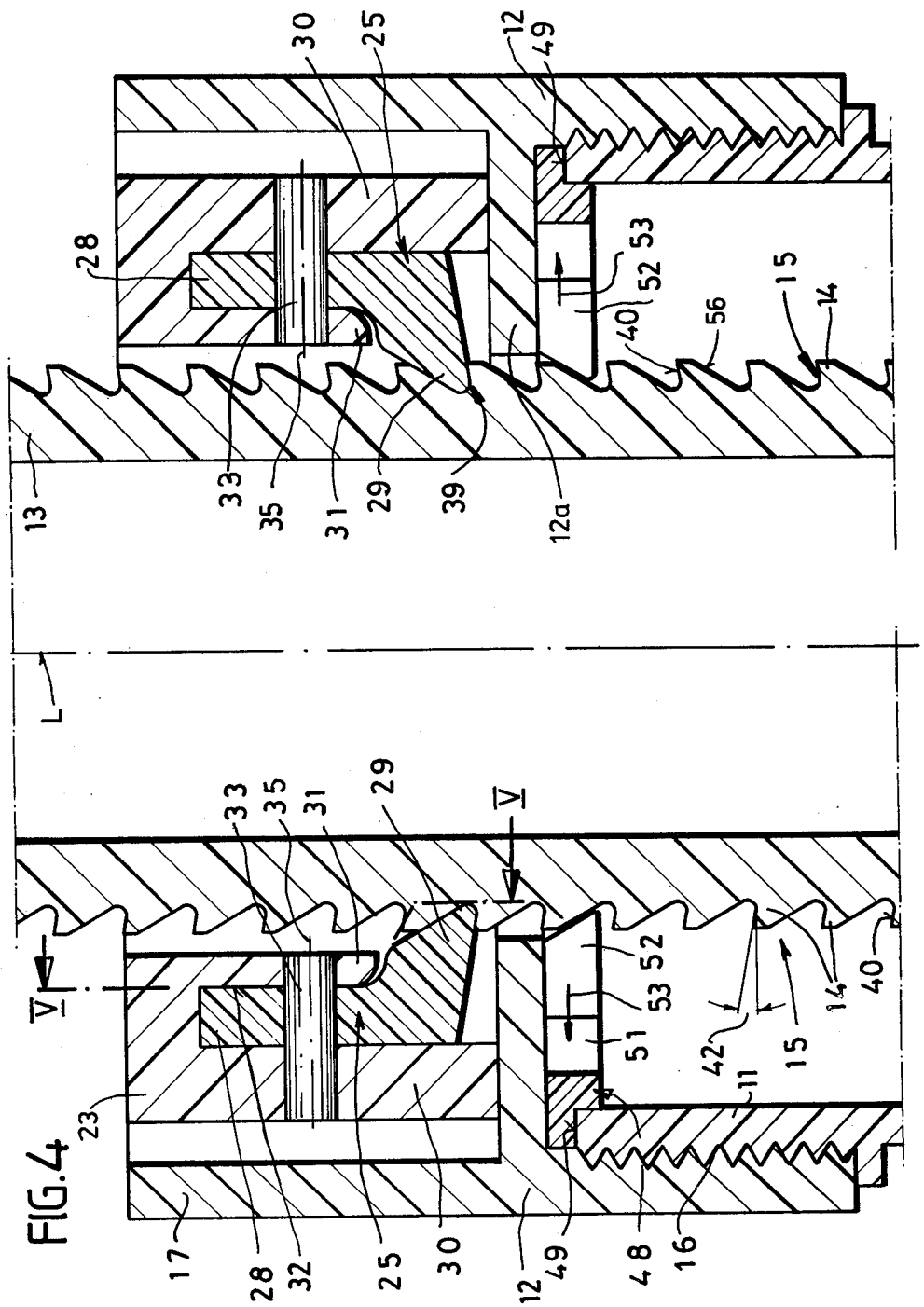

MANUAL EXTRUDER FOR SHAPING PASTA OR SIMILAR PRODUCTS

FIELD OF THE INVENTION

My present invention relates to a manually operable press for the extrusion of dough or a simialr pasty mass, e.g. a cream, through one or more nozzle apertures serving to produce shaped objects.

BACKGROUND OF THE INVENTION

Devices of this kind, particularly kitchen utensils used for making pasta, include a cylinder which usually is centered on a more or less vertical axis and contains a piston rod designed to expel the contained dough through an extrusion nozzle disposed at one end—generally the lower one—of that cylinder. A piston rod projects from the opposite cylinder end and is intermittently displaceable, with the aid of an operating lever articulated to the cylinder near that end, toward the nozzle end thereof. The lever, which is limitedly swingable in an axial plane of the cylinder, coacts with the rod through a one-way coupling so as to advance same on a forward swing (e.g. downward) and to release that rod on a reverse swing whereby the dough is progressively converted into the type of shaped products known as pasta. The one-way coupling may comprise a thrust member in the form of a pawl pivoted on or resiliently connected with the lever for drivingly engaging a sawtooth-shaped serration on a longitudinal surface of the piston rod; see, for example, German Pat. Nos. 958,011 and 2,704,432 (the latter being owned by the assignee of my present application). The first of these German patents also teaches the provision of a second serration on an opposite longitudinal surface of the piston rod, these two serrations being of different pitch and being alternatively juxtaposable with the driving pawl in order to let the user select a larger or a smaller advance of the piston on a given forward swing of the lever. Turning the rod through 90° confronts that pawl with a smooth surface so as to enable the unhindered manual retraction of the piston.

Another type of one-way coupling, described in German printed specification No. 11 40 525 published Dec. 6, 1962, discloses a one-way coupling in the form of an apertured plate which, upon an upswing of the operating lever against a fixed stop acting as a fulcrum, is tiltable into an inclined position in which the smooth piston rod is gripped between opposite edges of the plate aperture so as to execute a downward step. A similarly tiltable spring-loaded plate serves as a backstop. The frictional clamping of the rod by this kind of coupling enables only limited pressure to be exerted upon the piston head unless the applied force is so large that, with the apertured plate harder than the rod, the latter is notched by the gripping action.

Even with the positively acting pawl-type coupling described above, the known constructions require operating levers of considerable length in order to afford a suitable mechanical advantage in advancing the piston. This is due to the fact that, with the pivotal axis of the lever located at the far side of the piston rod as seen from the free lever end, the load arm measured between that pivotal axis and the junction of the driving pawl with the lever is relatively large and, as shown in German Pat. No. 958,011, may be about equal to the cylinder radius. The operating lever and other parts of the mechanism must therefore be able to sustain and transmit the considerable force which the user is required to apply. In the past, therefore, the devices here considered were generally made of metal.

OBJECT OF THE INVENTION

The object of my present invention is to provide an improved extrusion press of this character which, thanks to a greater mechanical advantage of its operating lever and a more effective one-way coupling thereof with the associated piston rod, is more compact and efficient than convenional models and can thus be constructed more economically, at least for the most part, from plastic material rather than metal.

SUMMARY OF THE INVENTION

An extrusion press according to my invenion comprises the usual piston cylinder with a shaping nozzle at one end and a mounting member traversed by the piston rod at its opposite end, this piston rod passing between branches of an extremity of an operating lever articulated to the mounting member for swinging about a pivotal axis which is skew to the cylinder axis. Pursuant to the present improvement, the piston rod has two diametrically opposite longitudinal peripheral zones provided with respective serrations of generally sawtooth-shaped profile and identical pitch, with steep rear flanks of the sawteeth facing away from the piston head reciprocable inside the cylinder. The two branches of the pivoted lever extremity have inner surfaces which, in a working position of the piston rod, respectively confront the two serrated zones and are provided with respective driving pawls whose front edges are engageable with the rear flanks of their sawteeth. The mounting member is further provided with detent means resiliently engageable with the serrations in the working position of the piston rod for backstopping same upon an advance thereof by the driving pawls, the piston rod being rotatable into an idle position in which the serrations are disaligned from the driving pawls as well as from the detent means.

Thanks to their lateral positioning with reference to the swing plane of the operating lever, the driving pawls are separated only by a fraction of the cylinder radius from the pivotal axis whose distance from the free lever end exceeds only slightly the length of the moment arm defined by the separation of that free end from the points of attachment of the driving pawls. This provides a considerably greater mechanical advantage in comparison with the known constructions referred to above. The duplication of the driving pawls on opposite sides of the piston rod, moreover, doubles the pressure that can be transmitted by a single pawl so that the pawls, the piston rod and the lever—as well as preferably all other major parts of the device—can be conveniently molded from plastic material. Particularly suitable for this purpose is a polyamide (nylon), reinforced with glass fibers where necessary. The replacement of metal by a plastic material also eliminates the risk of corrosion, this being especially important in the case of a kitchen utensil coming into contact not only with foodstuffs but also with water and detergents.

The driving pawls, of course, must be retractable from the associated serrations in the course of a reverse swing of the operating lever. When the lever consists of a polymeric material of suitable elesticity, the pawls could simply be designed as resilient tongues unitary with the branches supporting them. They could also be inherently inelastic but yieldably urged toward the piston rod by biasing springs anchored to the supporting lever branches. A simpler and sturdier arrangement, however, utilizes branches that are themselves sufficiently elastic to yield outward together with the driving pawls mounted thereon. For this purpose I prefer to design the rod-embracing lever extremity as a bifurcation whose prongs constitute the above-discussed branches and are pivoted to adjoining lateral walls of the mounting member which straddles these prongs with clearance enabling their elastic deformation on the reverse swing of the lever.

In an advantageous embodiment particularly described hereinafter, the pawls are fulcrumed on these prongs for swiveling about a common axis which is parallel to the swing axis of the lever and transverse to the cylinder axis. Instead of merely connecting the pawls with the prongs by simple pivot pins, I prefer to provide them with rear edges that are curved about their common axis and are contacted by correspondingly curved overhanging ledges of the prongs so that the thrust exerted upon the pawls on their driving engagement with the sawtooth flanks is absorbed mainly by these ledges rather than by the relatively fragile pins. The thrust-absorbing overhanging ledges may form end walls of pockets of the prongs that are open toward the piston head, the driving pawls then having shanks which are received in the pockets and include an obtuse angle with heels terminating in the aforementioned front edges. Pivot pins, whose main purpose is to withdraw the pawls from the serrations on the reverse swing, can then traverse the pockets so as to be supported at both ends instead of being merely cantilevered on the respective prongs.

Pursuant to another feature of my invention, an elastic ring constituting the detent means lies in a plane transverse to the cylinder axis and has incisions forming two pairs of radially deflectable strips which are separated by a small gap on opposite sides of a plane of symmetry bisecting the driving pawls. The ring may be braced against axial deformation by an internal annular shoulder of the mounting member which preferably comprises a sleeve threadedly secured to the adjoining cylinder end; thus, the detent ring can be clamped between that cylinder end and the shoulder for easy disassembly when the device is to be cleaned.

BRIEF DESCRIPTION OF THE DRAWING

The above and other features of my invention will now be described in detail with reference to the accompanying drawing in which:

FIG. 1 is a perspective view (parts broken away) of an extrusion press embodying my invention;

FIG. 2 is a fragmentary longitudinal sectional view of the device of FIG. 1, taken substantially on the line II—II thereof and drawn to a larger scale;

FIG. 3 is a top view of the assembly of FIG. 2, taken on the line III—III thereof;

FIG. 4 is a cross-sectional view taken on the line IV—IV of FIG. 3 and drawn to a still larger scale;

FIG. 7 is a fragmentary sectional view similar to part of FIG. 4 but illustrating a modification.

SPECIFIC DESCRIPTION

Figure 6:
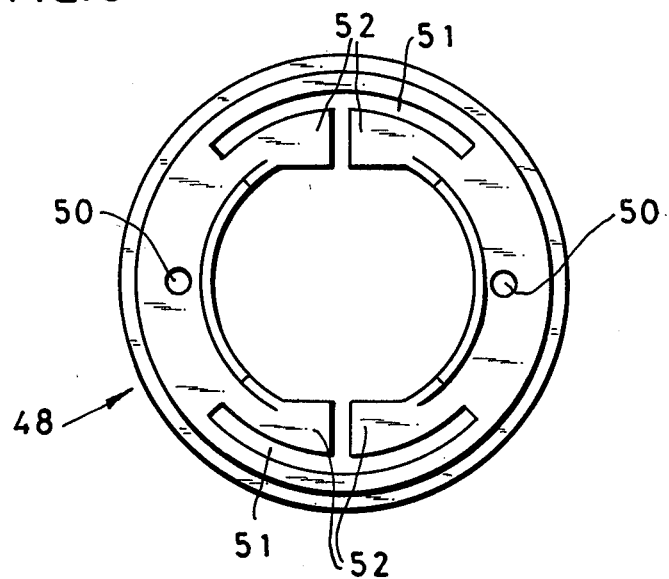
FIG. 6 is a bottom view of a detent ring, drawn to the scale of FIG. 2.

The device 10 shown in FIGS. 1–3 is a kitchen utensil designed for making pasta, comprising a cylinder 11 centered on an upright axis L (see FIG. 2) and provided at its lower end with a detachable extrusion nozzle 11a having an end disk 11b with several shaping apertures 11c. The upper end of cylinder 11 is partly closed by an inner annular shoulder 12a of a mounting sleeve 12 which, as see in FIG. 2, is removably screwed onto the cylinder by threads 16; an upward extension 17 of sleeve 12 forms a socket which is open at one side to give passage to an operating lever 18 having a bifurcate extremity with two prongs 23 received with clearance in that socket. Prongs 23 spacedly straddle a piston rod 13 whose upper end is provided with a handle 13a and whose lower end carries a piston head 13b reciprocable within cylinder 11.

Piston rod 13, which like all other parts of device 10 consists of plastic material such as glass-fiber-reinforced polyamide, is tubular and provided on two diametrically opposite longitudinal peripheral zones with serrations 15 which are defined by sawteeth 14 of identical pitch. Two other diametrically opposite longitudinal zones 55 of rod 13 are completely flat. In the working position illustrated in FIGS. 1–3, the serrated zones respectively confront the prongs 23 of lever 18 which are articulated to socket 17 by a pair of aligned studs 20 centered on a pivotal axis 19 and provided with outer heads 20a, the inner ends of these studs being received in bearing mounts 21 rising from shoulder 12a as more fully described hereinafter with reference to FIG. 5. Axis 19, it will be noted, lies just beyond piston rod 13 as seen from the free right-hand end of lever 18.

Prongs 23 are separated from each other by a narrow gap on opposite sides of a vertical plane 26 which includes the axis L of cylinder 11 and is perpendicular to pivotal axis 19. Another axial plane 27, perpendicular to plane 26, contains—in two limiting positions of lever 18—a common axis 35 of two pivot pins 33 illustrated in FIGS. 4 and 5. Fulcrumed on each of these pivot pins 33 is a driving pawl 25 which, in the lever positions referred to, is bisected by plane 27 and is of generally L-shaped configuration, with a rising shank 28 received in a downwardly open pocket 32 of the respective prong 23 and with a heel 29 which includes an obtuse angle with shank 28 and terminates in a horizontal front edge 39. That front edge, whose width substantially equals that of a steep rear flank 40 of each sawtooth 14, bears upon such rear flank in the horizontal position of lever 18—shown in full lines in FIG. 2—which represents the limit of its forward swing.

Heel 29 of pawl 25 has an angular profile defined by two flat faces converging in front edge 39, these faces coming to lie against the rear flank 40 of one sawtooth and a less steep front flank 56 of an adjoining sawtooth in the driving position of FIG. 4 so as to fill virtually completely the gap between two sawteeth 14. This wide-area engagement insures an optimum transmission of the lever pressure to piston rod 13 whose opposite serrations 15 coact simultaneously with the associated pawls 25. The backward thrust thus exerted upon the two driving pawls is absorbed for the most part by an end wall 45 of each pocket 32, shown in FIG. 5, which is curved about the common axis 35 of pivot pins 33 and is in all-around contact with a correspondingly curved rear edge 43 of shank 28.

Pivot pins 33, traversing the pockets 32 while being anchored in outer walls 30 and inner walls 31 thereof, are not particularly stressed by the driving force exerted during the forward swing but help extract the heels 29 of their pawls 25 from the engaged serrations when the lever 18 is swung upward into its retracted position illustrated in phantom lines in FIG. 2. In the midposition of that lever, separated by an angle w of about 11° from each of these two limiting positions, pins 33 lie on a common radial (i.e. horizontal) plane 37 with pivotal axis 19; thus, the heels 29 of pawls 25 are precisely aligned with sawteeth 14 in each of these two limiting positions of lever 18 and are only slightly offset therefrom in its midposition as their axis 35 travels along a small arc 38 centered on axis 19. The level difference 36 between axes 19 and 35 in either limiting position is shown to be only slightly less than the pitch of serrations 15; this insures that the two pawls will always engage the next-higher sawtooth 14 on the upswing of lever 18 so as to advance the piston head 13b by a step equal to that pitch during each downswing.

Figure 5:
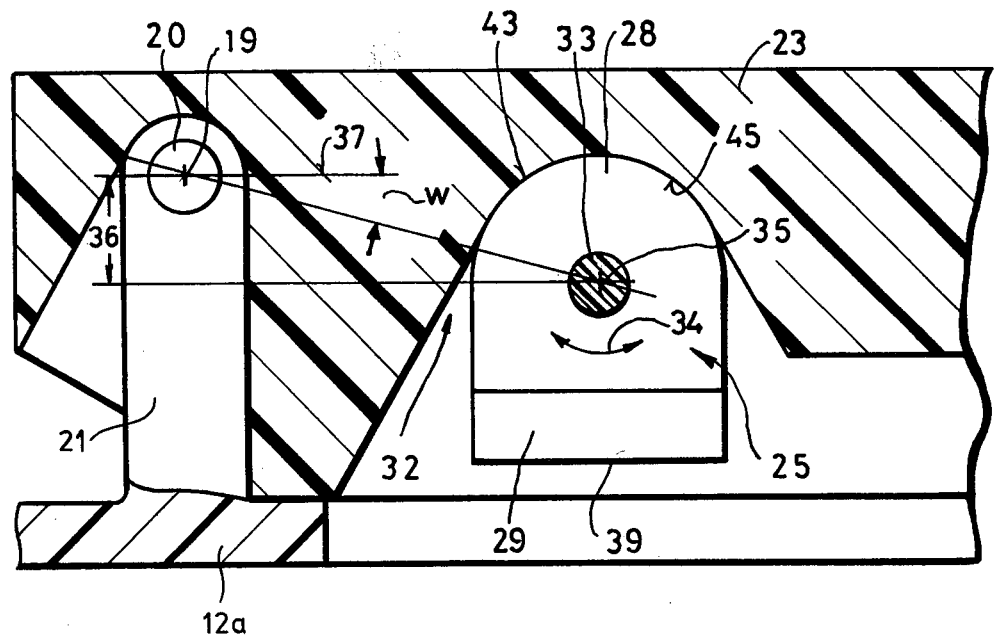
FIG. 5 is a fragmentary sectional view generally taken on the line V—V of FIG. 4.

FIG. 5 further shows the sides of pocket 32 diverging downwardly to an extent sufficient to let the pawl 25 maintain its depending attitude, with edge 39 remaining horizontal, while it swings relatively to the lever within its pocket as indicated by an arrow 34. The bearing mount 21 illustrated in FIG. 5, serving as an anchor for one of the studs 20 articulating the lever 18 to socket 17, is also seen to lie within a cutout of prong 23 imparting the necessary mobility to the lever.

The steep tooth flanks 40 illustrated in FIG. 4 are undercut so as to include with a radial plane an acute angle 42 of small size, e.g. about 10°. This undercut, and the corresponding inclination of the lower surface of the associated heel 29, insures a firm interengagement during a downstroke as the front edge 39 is cammed into the intertooth gap by the flank slope under the exerted pressure.

The limiting positions of lever 18 are established, as seen in FIG. 2, by a lug 46 on that lever alternately coming to rest on the top of sleeve 12 and on the underside of an overhanging lip 47 rigid with socket 7. As further seen in FIG. 2, a detent ring 48 is clamped between the upper end of cylinder 11 and the overlying shoulder 12a even as the lower edge of the sleeve abuts an annular rib 11d of the cylinder. Ring 48, as more clearly seen in the bottom view of FIG. 6, has two generally T-shaped diametrically opposite incisions 51 so as to form two pairs of strips 52 acting as retaining pawls for the piston rod 13. Thus, each pair of strips 52 normally project far enough toward cylinder axis L to enter the gap between two sawteeth 14 of an associated serration 15, these strips having an angular profile generally similar to that of heel 29 of the associated driving pawl 25. When lever 18 is upwardly retracted, strips 52 prevent a significant rise of piston rod 13 above the position into which it was last advanced. During the following forward swing, the strips 52 are cammed outward by the sloping tooth flanks 56 into the incision 51 as indicated by arrows 53 in FIG. 4. In order to maintain the correct angular position of ring 48, the same is provided with two holes 50 engaged by locator pins 44 which project from shoulder 12a as illustrated in FIG. 2.

From FIGS. 1–4 it will be apparent that the sawteeth 14 are formed by slanting cuts made in the outer peripheral surface 54 of rod 13, this surface being cylindrical except at the flat zones 55. When it is desired to decouple the piston from the operating lever 18, either for retracting it by means of handle 13a or for continuously depressing it into its bottom position, rod 13 is rotated by the handle 13a through 90° so that the flats 55 confront the pawls 25 and 52. This rotation, whether clockwise or counterclockwise, lets the pawls come to rest against the two flats and thus generate a slight resistance to further rotation, thereby insuring that the piston will not spontaneously leave its idle position. In the working position described above and shown in the drawing, the pawls 25 and 52 will have a similar stabilizing effect.

FIG. 7 illustrates a slightly modified arrangement wherein prongs 23' (only one shown) are unitary with tongues 25' acting as driving pawls, these tongues being elastically biased—similarly to retaining pawls 52—into engagement with sawteeth 14 of rod 13. This Figure also shows that the sawteeth may have rear flanks 40' lying in a radial plane instead of being undercut as in FIG. 4. The latter feature, of course, could also be used with the embodiment heretofore described whereas, in turn, undercut flanks may co-operate with tongues 25' if their free ends are similarly profiled; the described advantage of positive interlocking, resulting from such an undercut, would then be preserved with the modification of FIG. 7. That modification, furthermore, enables the clearance between prongs 23' and socket 17 to be reduced to a minimum since the prongs will no longer be required to yield outward during an upstroke of the operating lever; the position of prong 23' shown in FIG. 7 corresponds to a retraction of the lever.

It will be understood that, in operation, cylinder 11 will be placed on a suitable support allowing the extruded pasta to flow from apertures 11c into an underlying receptacle. Nozzle 11a could, of course, be replaced by one with differently shaped apertures when it is desired to vary the form of the pasta to be produced.

I claim:
1. A manually operable press for the extrusion of a pasty mass through at least one shaping aperture, comprising:

a cylinder provided at one end with an extrusion nozzle and at an opposite end with a mounting member;

a piston head reciprocable in said cylinder and provided with a piston rod projecting through said mounting member, said piston rod having two diametrically opposite longitudinal peripheral zones provided with respective serrations of generally sawtooth-shaped profile and identical pitch with steep rear sawteeth flanks facing away from said piston head;

an operating lever extending generally perpendicularly to said piston rod and having an extremity with two branches straddling the latter, said branches having inner surfaces provided with respective driving pawls having front edges engageable with said rear flanks of the corresponding serrations in a working position of said piston rod in which said longitudinal zones confront said inner surfaces, said extremity being articulated to said mounting member for swinging about a pivotal axis skew to the cylinder axis and more remote than said driving pawls from a free end of said lever, said lever being limitedly swingable in an axial plane of said cylinder about said pivotal axis for advancing said piston head toward said extrusion nozzle through the intermediary of said driving pawls on a forward swing and for retracting said driving pawls from said serrations on a reverse swing; and detent means on said mounting member resiliently engageable with said serrations in said working position for backstopping said piston rod upon an advance thereof by said driving pawls, said piston rod being rotatable into an idle position in which said serrations are disaligned from said feed pawls and from said detent means.

2. A press as defined in claim 1 wherein said piston rod has two smooth longitudinal peripheral zones perpendicular to the serrated zones thereof, said smooth zones confronting said driving pawls in said idle position.

3. A press as defined in claim 1 wherein said driving pawls are unitary with said branches.

4. A press as defined in claim 1 wherein said driving pawls are unitary with said branches.

5. A press as defined in claim 1 wherein said cylinder, piston head, piston rod, driving pawls, operating lever and detent means consist of plastic material.

6. A press as defined in claim 5 wherein said plastic material is a polyamide reinforced with glass fibers.

7. A press as defined in claim 1 wherein said mounting member is provided with abutments defining two limiting positions for the swing of said lever.

8. A press as defined in claim 7 wherein said lever is substantially perpendicular to said cylinder axis in its limiting forward position.

9. A press as defined in claim 1 wherein said detent means comprises an elastic ring in a plane transverse to the cylinder axis with incisions forming two pairs of radially deflectable strips separated by a small gap on opposite sides of a plane of symmetry which includes the cylinder axis and bisects said feed pawls in at least one position of said lever.

10. A press as defined in claim 9 wherein said mounting member forms an internal annular shoulder at said opposite end of said cylinder, said ring being disposed adjacent said shoulder with said strips projecting inward beyond the inner periphery of said shoulder.

11. A press as defined in claim 10 wherein said mounting member comprises a sleeve threadedly secured to said cylinder at said opposite end, said ring being clamped between said cylinder and said shoulder.

12. A press as defined in claim 11 wherein said shoulder and said ring are provided with interfitting formations preventing a relative rotation of said ring.

13. A press as defined in claim 1 wherein said extremity is bifurcate, said branches being a pair of resilient prongs articulated to adjoining lateral walls of said mounting member and straddled by said lateral walls with clearance for yielding outward together with said driving pawls on a reverse swing of said lever.

14. A press as defined in claim 13 wherein said driving pawls are fulcrumed on said prongs for swiveling about a common axis parallel to said pivotal axis and transverse to said cylinder axis.

15. A press as defined in claim 14 wherein said front edges are formed by converging faces of said driving pawls fitting closely between said rear flanks and adjoining front sawteeth flanks of said serrations.

16. A press as defined in claim 15 wherein said rear flanks are undercut to include a small angle with planes transverse to the cylinder axis.

17. A press as defined in claim 14 wherein said driving pawls have rear edges curved about said common axis and contacted by correspondingly curved overhanging ledges of said prongs.

18. A press as defined in claim 3 wherein said pivotal axis and said common axis lie in a common plane transverse to said cylinder axis in a midposition of the swing of said lever.

19. A press as defined in claim 17 wherein said ledges are end walls of pockets of said prongs open toward said piston head, said driving pawls having shanks received in said pockets and heels including an obtuse angle with said shanks, said heels terminating in said front edges.

20. A press as defined in claim 19 wherein said pockets are traversed by pivot pins passing through said shanks along said common axis.

* * * * *